United States Patent
Nakamura et al.

(10) Patent No.: US 9,785,125 B2
(45) Date of Patent: Oct. 10, 2017

(54) MOTOR CONTROL DEVICE FOR COMPENSATING BACKLASH

(71) Applicant: FANUC CORPORATION, Yamanashi (JP)

(72) Inventors: Tsutomu Nakamura, Yamanashi (JP); Satoshi Ikai, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 15/335,704

(22) Filed: Oct. 27, 2016

(65) Prior Publication Data

US 2017/0123384 A1    May 4, 2017

(30) Foreign Application Priority Data

Oct. 30, 2015    (JP) ................. 2015-213950

(51) Int. Cl.
  G05B 11/01    (2006.01)
  G05B 13/02    (2006.01)
  (Continued)

(52) U.S. Cl.
  CPC ....... G05B 13/0205 (2013.01); G05B 19/048 (2013.01); G05B 19/402 (2013.01);
  (Continued)

(58) Field of Classification Search
  CPC ........ G05B 19/404; G05B 2219/41032; G05B 2219/41078; G05B 2219/41265;
  (Continued)

(56) References Cited

U.S. PATENT DOCUMENTS 5,015,935 A * 5/1991 Iwashita ............... G05B 19/404
                                                        318/630
5,204,602 A * 4/1993 Iwashita ............... G05B 19/404
                                                        318/561
(Continued)

FOREIGN PATENT DOCUMENTS

JP        201454001 A    3/2014

OTHER PUBLICATIONS

English Abstract and Machine Translation for Japanese Publication No. 2014-054001, published Mar. 20, 2014, 16 pgs.

*Primary Examiner* — Bickey Dhakal
(74) *Attorney, Agent, or Firm* — Fredrikson & Byron, P.A.

(57) ABSTRACT

A motor control device includes a first position detecting unit for detecting a position of a movable part, a second position detecting unit for detecting a position of a driven part, an error computing unit for computing an error between a first position detection value detected by the first position detecting unit and a second position detection value detected by the second position detecting unit, a memory unit for memorizing, as an initial error, an error computed when the movable part engages with the driven part, a compensation amount computing unit for computing a backlash compensation amount for compensating backlash, a compensation gain computing unit for computing a compensation gain based on the acceleration command, and a compensation amount computing unit for computing the backlash compensation amount using the compensation gain.

3 Claims, 3 Drawing Sheets

(51) Int. Cl.
 *G05B 19/048* (2006.01)
 *G05B 19/402* (2006.01)
 *G05B 23/02* (2006.01)

(52) U.S. Cl.
 CPC .............. *G05B 23/0294* (2013.01); *G05B 2219/41032* (2013.01); *G05B 2219/41265* (2013.01)

(58) Field of Classification Search
 CPC ........... G05B 2219/42298; G05B 2219/43054; G05B 2219/41124; G05B 2219/42036
 USPC ...................................................... 318/560
 See application file for complete search history.

(56) References Cited

U.S. PATENT DOCUMENTS

| | | | |
|---|---|---|---|
| 9,018,886 B2* | 4/2015 | Iwashita | G05B 19/404 318/560 |
| 9,541,916 B2* | 1/2017 | Nakamura | G05B 19/404 |

\* cited by examiner

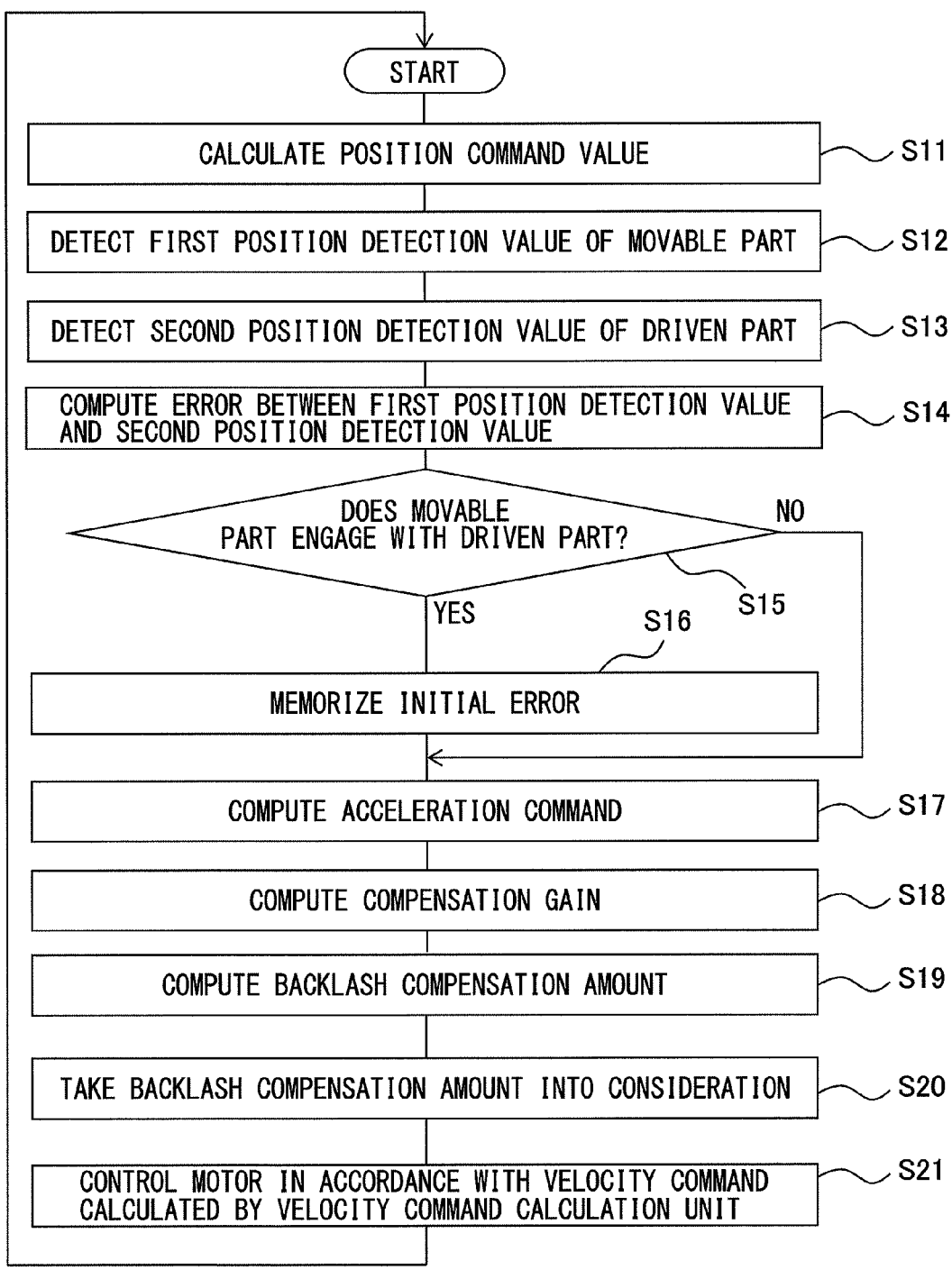

MOTOR CONTROL DEVICE FOR COMPENSATING BACKLASH

BACKGROUND OF THE INVENTION

1. Field of the Invention

The present invention relates to a motor control device for compensating backlash between a movable part to be driven by a motor and a driven part to be driven by the movable part.

2. Description of the Related Art

A servomotor is coupled to a feed axis of an industrial machine or a machine tool, or for example, to an arm of an industrial robot (mechanical movable part). The rotation of the servomotor is converted into linear motion of, for example, a table via, for example, a ball screw, or the conduction velocity of the servomotor is reduced by a reduction drive.

In the ball screw or the reduction drive, there may be a difference between a stop position in a positive direction toward a given position and a stop position in a negative direction. Such a difference is generally referred to as "backlash", and could impair the positioning accuracy.

FIGS. 3A to 3C are drawings to explain backlash. FIG. 3A illustrates a movable part WA to be moved by a motor (not shown) and a driven part WB to be driven by the movable part WA. The movable part WA has, at its both ends, projecting portions A1 and A2. The driven part WB has, at its center, a protruding portion B. Thus, when, for example, the movable part WA moves rightward, an inner end of the projecting portion A1 of the movable part WA engages with one end of the protruding portion B of the driven part WB. This moves the movable part WA and the driven part WB together to the right-hand side.

When the motor is inverted, the velocity of the movable part WA is inverted so that the moving direction of the movable part WA is changed from rightward to leftward (FIG. 3B). Then, when an inner end of the projecting portion A2 of the movable part WA engages with the other end of the protruding portion B of the driven part WB as shown in FIG. 3C, the movable part WA and the driven part WB move together to the left-hand side.

As described above, the movable part WA has to move by a predetermined moving amount referred to as backlash when being inverted, before the movable part WA engages with the driven part WB. FIGS. 3A and 3C show backlash having a length L. The backlash may reduce the positioning accuracy.

In order to prevent this reduction, it has been known to calculate a compensation amount for backlash, and to add the compensation amount to a position command for a motor at the time of inverting. In Japanese Unexamined Patent Publication (Kokai) No. 2014-054001, a compensation amount for backlash is calculated based on a position error between a movable part and a driven part at present, and a position error between the movable part and the driven part when the movable part engages with the driven part.

SUMMARY OF THE INVENTION

However, when the movable part WA is inverted as described above, the time necessary to invert the velocity of the movable part WA may vary depending on, for example, the types of workpieces to be machined. Specifically, when a workpiece is machined along a circular path, the time necessary for velocity inversion varies depending on the radius of the circular path and the moving velocity along the circular path.

In conventional technologies, for example, Japanese Unexamined Patent Publication (Kokai) No. 2014-054001, a backlash compensation amount is computed without taking the time necessary for velocity inversion into consideration. Thus, in conventional technologies, depending on the types of workpieces, specifically, the types of machining routes for workpieces, an appropriate backlash compensation amount cannot be obtained in some cases.

The present invention was made in light of the circumstances described above and has an object to provide a motor control device capable of computing a backlash compensation amount for which the time necessary for velocity inversion is taken into consideration.

To achieve the above object, according to a first aspect of the invention, there is provided a motor control device for compensating backlash between a movable part to be driven by a motor and a driven part to be driven by the movable part. The motor control device includes a position command calculation unit for calculating a position command for the driven part, a first position detecting unit for detecting a position of the movable part, a second position detecting unit for detecting a position of the driven part, an error computing unit for computing an error between a first position detection value detected by the first position detecting unit and a second position detection value detected by the second position detecting unit, a memory unit for memorizing, as an initial error, the error computed by the error computing unit when the movable part engages with the driven part, an acceleration computing unit for computing an acceleration command based on the position command, a compensation gain computing unit for computing a compensation gain based on the acceleration command computed by the acceleration computing unit, and a compensation amount computing unit for computing a backlash compensation amount for compensating the backlash by multiplying an error between the initial error memorized by the memory unit and the error computed by the error computing unit, by the compensation gain computed by the compensation gain computing unit.

According to a second aspect of the invention, in the motor control device according to the first aspect of the invention, the compensation gain computing unit computes the compensation gain so as to be proportional to the one-half power of the acceleration command.

According to a third aspect of the invention, in the motor control device according to the first or second aspect of the invention, the compensation amount computing unit sets the upper limit of the backlash compensation amount, which is determined in accordance with the acceleration command.

These objects, features, and advantages of the present invention and other objects, features, and advantages will become further clear from the detailed description of typical embodiments illustrated in the appended drawings.

BRIEF DESCRIPTION OF THE DRAWINGS

FIG. 2 is a flowchart of the operation of a motor control device according to the present invention.

DETAILED DESCRIPTION

Figure 1:
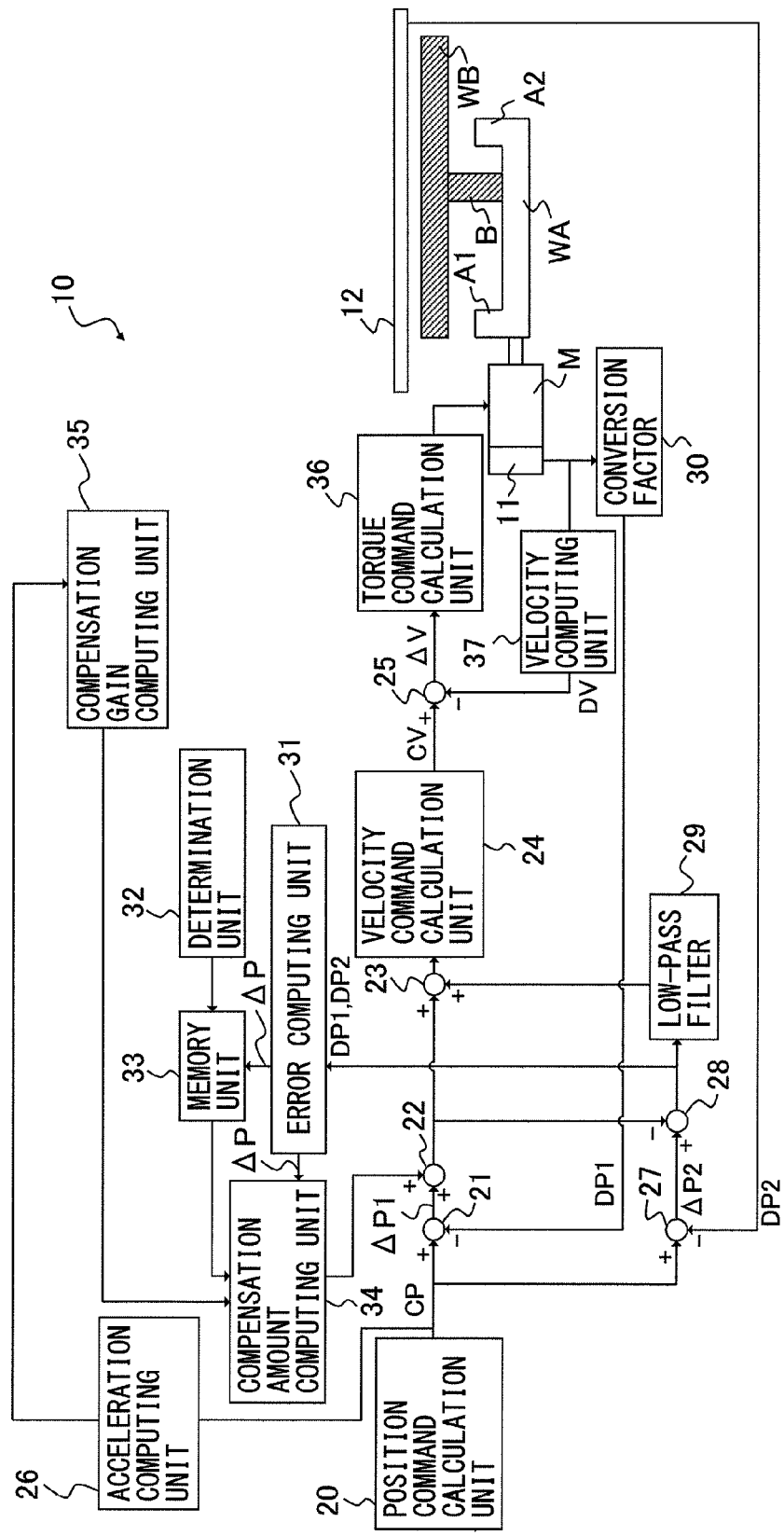
FIG. 1 is a block diagram of the functions of a motor control device according to the present invention.

Embodiments of the present invention will be described below with reference to the accompanying drawings. In the following figures, similar members are designated with the same reference numerals. These figures are properly modified in scale to assist the understanding thereof.

FIG. 1 is a block diagram of the functions of a motor control device according to a first embodiment of the present invention. As shown in FIG. 1, a movable part WA having projecting portions A1 and A2 is attached to an output axis of a motor M via screws. Further, a driven part WB having a protruding part B is disposed so as to engage with the movable part WA.

Figure 3A:
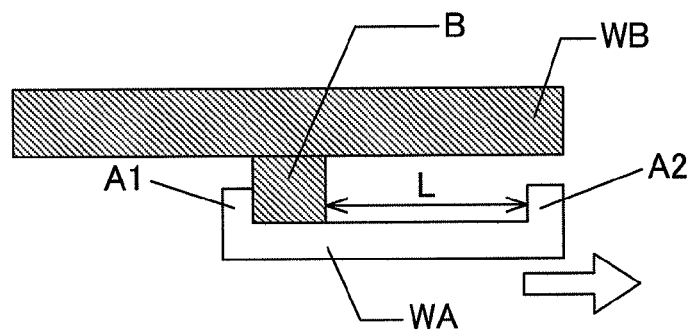
FIG. 3A is a first explanatory view of backlash.
Figure 3B:
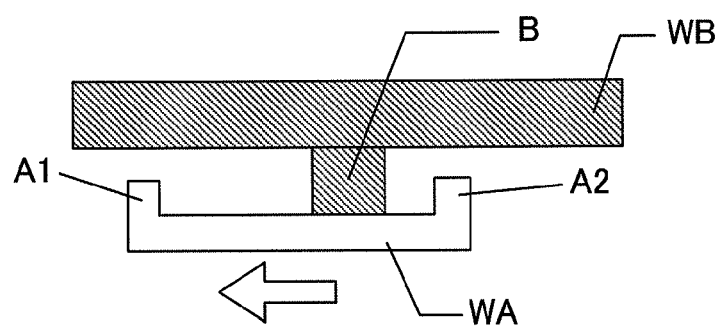
FIG. 3B is a second explanatory view of backlash.
Figure 3C:
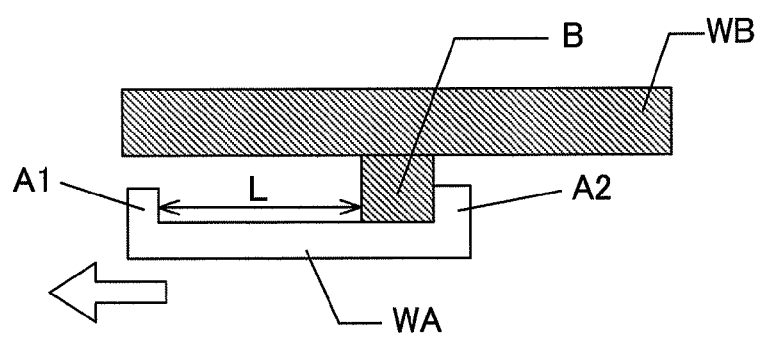
FIG. 3C is a third explanatory view of backlash.

As described with reference to FIG. 3A, there is backlash having a length L between the movable part WA and the driven part WB. The backlash is obtained by measuring the moving distance of the movable part WA by, for example, a three-dimensional measuring instrument, and comparing the same with the moving amount of the motor M, to measure the difference therebetween. Alternatively, the backlash may be found by measuring a so-called quadrant projection generated when one quadrant is shifted to another in the movement along a circular path.

As shown in FIG. 1, a first position detecting unit 11, for example, an encoder for detecting the position of the movable part WA is attached to the motor M. The first position detecting unit 11 can also detect the velocity of the movable part WA using a known method. Further, a second position detecting unit 12, for example, a scale for detecting the position of the driven part WB is disposed to be adjacent to the driven part WB.

A motor control device 10 mainly includes a position command calculation unit 20 for periodically calculating a position command value CP for the driven part WB, a velocity command calculation unit 24 for calculating a velocity command for the movable part WA, and a torque command calculation unit 36 for calculating a torque command for the motor M. Note that an acceleration command calculation unit 26 directly calculates an acceleration command from the position command value CP of the position command calculation unit 20.

Further, the motor control device 10 includes an error computing unit 31 for computing an error ΔP between a first position detection value DP1 detected by the first position detecting unit 11 and a second position detection value DP2 detected by the second position detecting unit 12. The motor control device 10 includes a determination unit 32 for determining whether the movable part WA engages with the driven part WB when the movable part WA moves from a given initial position in a first driving direction or in a second driving direction opposite to the first driving direction.

Further, the motor control device 10 includes a memory unit 33 for memorizing, as an initial error ΔP0, the error ΔP computed by the error computing unit 31, which is linked to the first driving direction or the second driving direction, when the determination unit 32 determines that the movable part WA engages with the driven part WB. Note that the memory unit 33 can memorize other elements including velocity etc. The motor control device 10 also includes a compensation amount computing unit 34 for computing a backlash compensation amount for eliminating backlash. The motor control device 10 also includes a compensation gain computing unit 35 for computing a compensation gain based on the acceleration command computed by an acceleration computing unit 26.

FIG. 2 is a flowchart of the operation of a motor control apparatus according to the present invention. The contents shown in FIG. 2 are repeated at predetermined control intervals. The operation of a motor control device according to the present invention will be described below with reference to FIGS. 1 and 2.

First, in step S11 of FIG. 2, the position command calculation unit 20 calculates the position command value CP. Subsequently, in steps S12 and S13, the first position detecting unit 11 and the second position detecting unit 12 respectively detect the first position detection value DP1 of the movable part WA and the second position detection value DP2 of the driven part WB.

As shown in FIG. 1, a subtractor 21 subtracts the first position detection value DP1 detected by the first position detecting unit 11 from the position command value CP calculated by the position command calculation unit 20, to calculate a first position error ΔP1. Note that, as can be seen from FIG. 1, the first position detection value DP1 is multiplied by a conversion factor 30.

Further, a subtractor 27 subtracts the second position detection value DP2 detected by the second position detecting unit 12 from the position command value CP, to calculate a second position error ΔP2. A subtractor 28 subtracts the first position error ΔP1 from the second position error ΔP2, and inputs the obtained value to an adder 23 through a low-pass filter 29. The reason that the low-pass filter 29 is used here is to stably move the movable part by controlling the position based on a position detection value from the first position detecting unit when a change in the position error is large, and by controlling the position based on a position detection value from the second position detecting unit when a change in the position error is small, to improve the positioning accuracy of the driven part. The first position error ΔP1 and the second position error ΔP2, which has been added by the adder 23, are inputted to the velocity command calculation unit 24, to calculate a velocity command value CV. Further, the first position detection value detected by the first position detecting unit 11 is inputted to a velocity computing unit 37, to compute a velocity detection value DV, and a subtractor 25 subtracts the velocity detection value DV from the velocity command value CV, to compute a velocity error ΔV. Subsequently, the torque command calculation unit 36 calculates a torque command value based on the velocity error ΔV, and inputs the same to the motor M.

As can be seen from FIG. 1, in the present invention, a value obtained by subtracting the first position error ΔP1 from the second position error ΔP2 is inputted to the error computing unit 31. In this value, the position command value CP is substantially excluded. Thus, the error computing unit 31 can easily compute the error ΔP between the first position detection value DP1 and the second position detection value DP2 (step S14). Alternatively, the first position error ΔP1 and the second position error ΔP2 are directly inputted to the error computing unit 31, to calculate the error ΔP.

Subsequently, as indicated in step S15, the determination unit 32 determines whether the movable part WA has engaged with the driven part WB. The operation of the determination unit 32 is publicly known, and accordingly, the detailed explanation thereof is omitted. The operation of the determination unit 32 is described in, for example, Japanese Unexamined Patent Publication (Kokai) No. 2014-054001.

When it is determined that the movable part WA has engaged with the driven part WB, the process is shifted to step S16. In step S16, the memory unit 33 memorizes, as an initial error, the error computed by the error computing unit 31 when the movable part WA has engaged with the driven part WB. Note that, when it is not determined that the movable part WA has engaged with the driven part WB, the process of step S16 is skipped.

Subsequently, in step S17, the acceleration command calculation unit 26 calculates an acceleration command based on the position command value CP. Then the acceleration command is inputted to the compensation gain computing unit 35. Alternatively, the acceleration command, which has been multiplied by a predetermined factor, may be inputted to the compensation gain computing unit 35.

Subsequently, in step S18, the compensation gain computing unit 35 computes a compensation gain based on the acceleration command. The time necessary to invert the velocity of the movable part WA is generally short, and accordingly, the acceleration of the movable part WA is deemed to be constant within the time necessary for velocity inversion.

Thus, when the movable part WA moves at an acceleration a in a time t necessary for velocity inversion, a distance x is expressed by Equation (1) below:

$$x = \frac{at^2}{2} \quad (1)$$

Assuming that the distance x corresponds to a backlash length L shown in FIG. 3A, the time t necessary for velocity inversion is expressed by Equation (2) below:

$$t = \sqrt{\frac{2L}{a}} \quad (2)$$

In short, the time t necessary for velocity inversion is inversely proportional to the one-half power of acceleration. Thus, in step S18, the compensation gain computing unit 35 computes a compensation gain K proportional to the one-half power of acceleration, as expressed in Equation (3) below:

$$K \propto \sqrt{a} \quad (3)$$

Subsequently, in step S19, the compensation amount computing unit 34 computes a backlash compensation amount for compensating backlash. Specifically, the error computing unit 31 computes the error at present, and further computes an error between the error at present and the initial error memorized in the memory unit 33. The obtained error is then multiplied by the compensation gain computed by the compensation gain computing unit 35, to compute the backlash compensation amount.

Specifically, the backlash compensation amount is expressed by Equation (4) below:

(backlash compensation amount)=((initial error)−
(error at present))×K       (4)

In step S20, the backlash compensation amount is taken into consideration. With reference to FIG. 1, the backlash compensation amount computed by the compensation amount computing unit 34 is added to the first position error ΔP1 in an adder 22. The obtained value is then supplied to the velocity command calculation unit 24 through the adder 23, to calculate the velocity command value CV. Finally, the torque command calculation unit 36 calculates a torque command value. Thus, the motor M is controlled (step S21).

As described above, in the present invention, the compensation gain is computed based on the acceleration command. The acceleration command and the time necessary for inversion have the relationship expressed by Equation (2). Accordingly, in the present invention, taking the time necessary for velocity inversion into consideration, an appropriate backlash compensation amount can be computed.

When a workpiece is machined along a circular path, the time necessary for velocity inversion varies depending on the radius of the circular path and the moving velocity along the circular path. In the present invention, the time necessary for velocity inversion is taken into consideration, and accordingly, even when a workpiece is machined along the circular path, it will be understood that an appropriate backlash compensation amount can be computed. Note that, when a workpiece is machined along the circular path, it is necessary to move the workpiece or a tool using two or more motors M. Thus, in this instance, the position command value CP is calculated for each motor, and a compensation gain and a backlash compensation amount are computed for each motor.

Further, the backlash compensation amount calculated by the compensation amount computing unit 34 does not exceed the backlash length L. Thus, if the backlash compensation amount calculated by the compensation amount computing unit 34 exceeds the backlash length L, it is preferable that the compensation amount computing unit 34 restricts the calculated backlash compensation amount to a value not greater than the backlash length L. This prevents the calculated backlash compensation amount from having an abnormally large value.

EFFECT OF THE INVENTION

There is a predetermined relationship between an acceleration command and a time necessary for velocity inversion. In the first aspect of the invention, a compensation gain is computed based on the acceleration command. Thus, taking the time necessary for velocity inversion into consideration, an appropriate backlash compensation amount is calculated. Thus, even when a workpiece is machined along a circular path, an appropriate backlash compensation amount can be calculated.

In the second aspect of the invention, a more appropriate backlash compensation amount can be calculated by a simple structure.

In the third aspect of the invention, the upper limit corresponds to, for example, a backlash length. In this instance, the backlash compensation amount does not exceed the backlash length. Restricting the backlash compensation amount to a value not greater than the backlash length prevents the calculated backlash compensation amount from having an abnormally large value.

The present invention has been described above using exemplary embodiments. However, a person skilled in the art would understand that the aforementioned modifications and various other modifications, omissions, and additions can be made without departing from the scope of the present invention.

What is claimed is:

1. A motor control device for compensating backlash between a movable part to be driven by a motor and a driven part to be driven by the movable part, comprising:
a position command calculation unit calculates a position command for the driven part;

a first position detecting unit for detecting a position of the movable part;

a second position detecting unit detects a position of the driven part;

an error computing unit computes an error based on a first position detection value detected by the first position detecting unit and a second position detection value detected by the second position detecting unit;

a memory unit memorizes, as an initial error, the error computed by the error computing unit when the movable part engages with the driven part;

an acceleration computing unit computes an acceleration command based on the position command;

a compensation gain computing unit computes a compensation gain based on the acceleration command computed by the acceleration computing unit; and a compensation amount computing unit computes a backlash compensation amount for compensating the backlash by multiplying an error between the initial error memorized by the memory unit and the error computed by the error computing unit, by the compensation gain computed by the compensation gain computing unit.

2. The motor control device according to claim 1, wherein the compensation gain computing unit computes the compensation gain so as to be proportional to the one-half power of the acceleration command.

3. The motor control device according to claim 1, wherein the compensation amount computing unit sets the upper limit of the backlash compensation amount, which is determined in accordance with the acceleration command.

* * * * *